United States Patent [19]

Michaud et al.

[11] Patent Number: 4,985,527

[45] Date of Patent: Jan. 15, 1991

[54] PREPARATION OF THERMALLY STABLE COPOLYIMIDOAMIDES CONTAINING DIORGANOPOLYSILOXANE RECURRING UNITS

[75] Inventors: Philippe Michaud, Villeurbanne; Christian Prud'Homme, Lyons, both of France

[73] Assignee: Rhone-Poulenc Chimie, Coubevoie, France

[21] Appl. No.: 409,398

[22] Filed: Sep. 19, 1989

[30] Foreign Application Priority Data

Sep. 19, 1988 [FR] France .................. 88 12416

[51] Int. Cl.$^5$ .............................. C08G 77/00
[52] U.S. Cl. ........................... 528/26; 528/28
[58] Field of Search .................... 528/26, 28

[56] References Cited

U.S. PATENT DOCUMENTS 4,728,697 3/1988 Bolon et al. ................ 528/26

Primary Examiner—Maurice J. Welsh
Attorney, Agent, or Firm—Burns, Doane, Swecker & Mathis

[57] ABSTRACT

Thermally stable copolyimidoamides containing recurring diorganopolysiloxane structural units are improvedly prepared by directly interreacting, in a solvent medium:

(i) a diisocyanate of the formula:

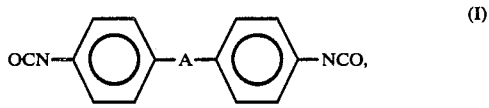

(ii) a monoanhydride of a tricarboxylic acid of the formula:

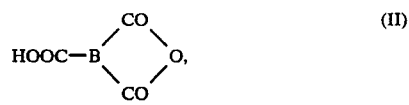

(iii) a siloxane diisocyanate of the formula:

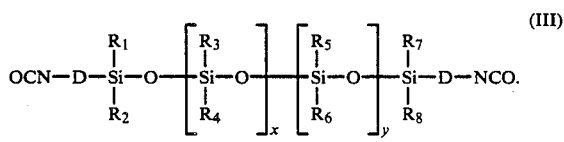

17 Claims, No Drawings

PREPARATION OF THERMALLY STABLE COPOLYIMIDOAMIDES CONTAINING DIORGANOPOLYSILOXANE RECURRING UNITS

BACKGROUND OF THE INVENTION

1. Field of the Invention:

The present invention relates to a novel process for the preparation of thermally stable copolymers comprising recurring imide/amide and diorganopolysiloxane structural units.

2. Description of the Prior Art:

The combination of recurring imide/amide and diorganopolysiloxane structural units has to date been advantageously used in the preparation of polymers which can be employed in insulating coating applications, for which the coating must have an excellent thermal stability. Representative prior art which describes polymers of this type includes U.S. Pat. Nos. 3,723,385 and 4,395,527. In these patents, polyimidoamides are described which contain diorganopolysiloxane recurring units which are the product of a condensation reaction in solution between a diprimary diamine containing a diorganopolysiloxane group, whether alone or in admixture with another diprimary organic diamine, and a monoanhydride of a tricarboxylic acid. However, such a process presents the disadvantage, common to the majority of processes where an amine reactant is reacted with an organic compound containing a carboxylic acid anhydride functional group, of requiring a cyclizing dehydration of the polyamic acid intermediates. Indeed, since this reaction forms an equilibrium, the water released must be removed, and this operation cannot generally be carried out completely in solution.

SUMMARY OF THE INVENTION

Accordingly, a major object of the present invention is the provision of an improved process for the preparation of thermally stable copolymers comprising recurring imide/amide and diorganopolysiloxane structural units which conspicuously avoids those disadvantages and drawbacks to date characterizing the state of this art. In such improved process of this invention, cyclization and simultaneous polymerization result in the direct formation of polyimidoamides containing recurring diorganopolysiloxane units, and are accompanied by a release of carbon dioxide, a highly volatile material, which does not present the risk of degrading or deteriorating the polymer already formed.

Briefly, the present invention features an improved process for the preparation of copolyimidoamides containing recurring diorganopolysiloxane structural units, comprising directly reacting the following reactants (i), (ii) and (iii), at a temperature ranging from 50° C. to 210° C. and in the presence of an organic solvent or a mixture of organic solvents:

(i) a diisocyanate of the formula:

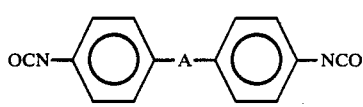

(I)

in which the symbol A is a single valence bond or one of the following radicals:

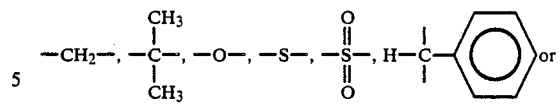

(ii) a monoanhydride of tricarboxylic acid of the formula:

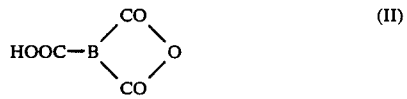

(II)

in which B is a trivalent radical comprising a substituted or unsubstituted aromatic radical, or of two such radicals bonded together va a single valence bond or one of the following radicals:

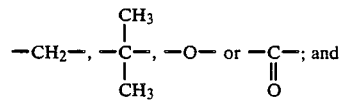

(iii) a diisocyanate containing a recurring diorganopolysiloxane unit of the formula:

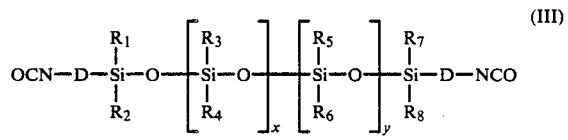

(III)

in which D is a divalent radical having the formula:

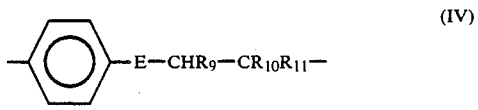

(IV)

the benzene ring of which is directly bonded to the isocyanate functional group NCO; the symbol E is a single valence bond, a diorganosilyl a group of the formulae:

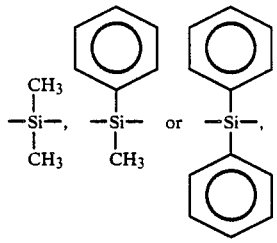

or a divalent group comprising an alkylene radical containing from 1 to 6 carbon atoms which is bonded on one end to the benzene ring by a single valence bond, an oxygen atom, a sulfur atom, an ester functional group or an amide functional group, and, on the other end, to the group CHR$_9$–CR$_{10}$R$_{11}$ by a single valence bond or via a diorganosilyl group of the formulae:

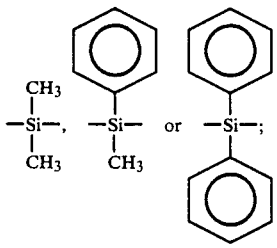

each of the symbols R$_9$, R$_{10}$ and R$_{11}$, which may be identical or different, is a hydrogen atom or a linear or branched chain alkyl radical containing from 1 to 6 carbon atoms; each of R$_1$, R$_2$, R$_3$, R$_4$, R$_5$, R$_6$, R$_7$ and R$_8$, which may be identical or different, is a monovalent hydrocarbon radical selected from among linear or branched chain alkyl radicals containing from I to 12 carbon atoms, with the proviso that such radicals may be substituted by one or more chlorine, bromine or fluorine atoms or by a —CN group; or a phenyl radical optionally substituted by one or more alkyl and/or alkoxy radicals containing from 1 to 4 carbon atoms or by one or more chlorine atoms; the symbols x and y denote numbers, which may be identical or different, whole or fractional, the sum of which ranges from 0 to 100; with the provisos that the respective proportions of the reactants (i) and (ii) are such that the ratio r:
  number of moles of anhydride (ii)/number of moles of diisocyanate (i)
ranges from 1.01/1 to 3/1; and the proportion of the reactant (iii) is such that the ratio r':
  number of moles of siloxane diisocyanate (iii)/(number of moles of anhydride (ii)—number of moles of diisocyanate (i))
is equal to 1.

The copolyimidoamides prepared by the process according to the present invention comprise recurring structural units which may be represented by the following general formula:

mula (II) either via an amide functional group or via an imide functional group.

DETAILED DESCRIPTION OF THE PREFERRED EMBODIMENTS OF THE INVENTION

More particularly according to the present invention, exemplary of the diisocyanate (i) of formula (I), particularly representative are:
4,4'-Diisocyanato-2,2-diphenylpropane;
4,4'-Diisocyanatobiphenyl;
4,4'-Diisocyanatodiphenyl sulfide;
4,4'-Diisocyanatodiphenyl sulfone;
4,4'-Diisocyanatodiphenyl ether; and
4,4'-Diisocyanato-1,1-diphenylcyclohexane.
4,4'-Diisocyanatodiphenylmethane and 4,4'-diisocyanatodiphenyl ether are the preferred diisocyanates according to the present invention.

Exemplary of the monoanhydrides of tricarboxylic acids (ii) of formula (II), particularly representative are:
The monoanhydride of trimellitic acid;
The 2,3-monoanhydride of 2,3,6-naphthalenetricarboxylic acid;
The 1,8-monoanhydride of 1,8,4-naphthalenetricarboxylic acid;
The 1,2-monoanhydride of 1,2,5-naphthalenetricarboxylic acid;
The 3,4-monoanhydride of 3,4,4'-diphenyltricarboxylic acid;
The 3,4-monoanhydride of diphenyl sulfone 3,4,3'-tricarboxylic acid;
The 3,4-monoanhydride of diphenyl ether 3,4,4'-tricarboxylic acid;
The 3,4-monoanhydride of 3,4,4'-benzophenonetricarboxylic acid; and
The 3,4-monoanhydride of 3,4,3'-diphenylisopropylidenetricarboxylic acid.

The monoanhydride of trimellitic acid is the preferred anhydride according to the present invention.

As regards the siloxane diisocyanates (iii) of formula (III), when x and/or y are greater than 1, these are polymeric compounds and they are rarely a single com-

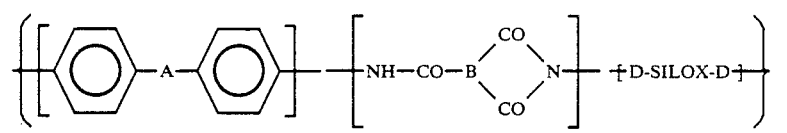

(v)

in which the symbols A, B and D are as defined above and the expression "SILOX" denotes the recurring diorganopolysiloxane unit:

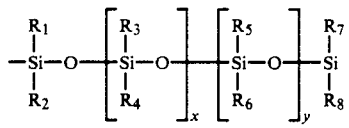

constituting the siloxane diisocyanate of formula (III). The formula (V) has been generalized and it should be appreciated that it includes the recurring units in which the residue originating from the aromatic diisocyanate (i) of formula (I), or the residue originating from the siloxane diisocyanate (iii) of formula (III), is bonded to the residue originating from the anhydride (ii) of forpound. In most cases they comprise a mixture of compounds of the same chemical structure, which differ in the number of recurring units in their molecule. This results in an average value of x and/or y which may either be whole or fractional.

Exemplary of the diisocyanates which correspond to the formula (III) are those in which:

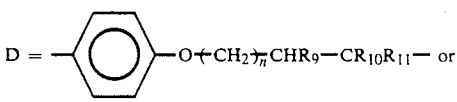

7.

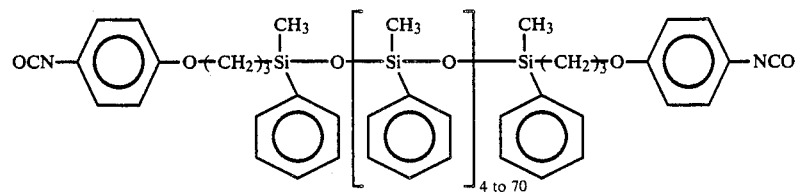

8.

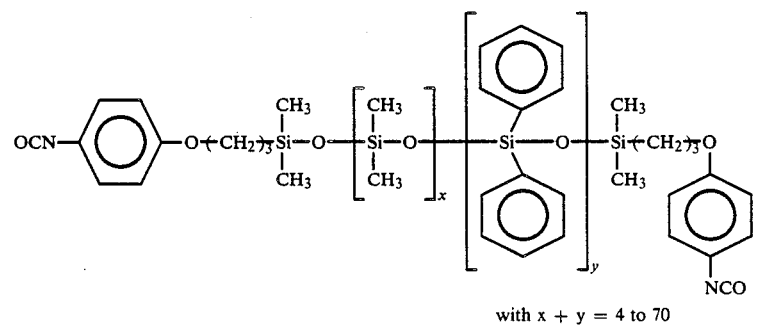

with x + y = 4 to 70

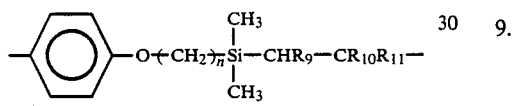

with n = 1, 2 or 3 and $R_9 = R_{10} = R_{11}$ = a hydrogen atom or a linear alkyl radical containing from 1 to 3 carbon atoms; $R_1 = R_2 = R_3 = R_4 = R_5 = R_6 = R_7 = R_8$ = linear alkyl radical containing from 1 to 3 carbon atoms; x+y ranges from 0 to 100 and, preferably, from 4 to 70;

2. D is as defined above in paragraph 1; $R_1 = R_2 = R_3 = R_4 = R_7 = R_8$ = linear alkyl radical containing from 1 to 3 carbon atoms; $R_5 = R_6$ = phenyl radical; x+y ranges from 0 to 100 and, preferably, from 4 to 70;

3. D is as defined above in paragraph 1; $R_1 = R_2 = R_7 = R_8$ = linear alkyl radical containing from 1 to 3 carbon atoms; $R_3 = R_4 = R_5 = R_6$ = phenyl radical; x+y ranges from 0 to 100 and, preferably, from 4 to 70;

4. D is as defined above in paragraph 1; $R_1 = R_2 = R_3 = R_5 = R_7 = R_8$ = linear alkyl radical containing from 1 to 3 carbon atoms; $R_4 = R_6$ = phenyl radical; x+y ranges from 0 to 100 and, preferably, from 4 to 70;

5. D is as defined above in paragraph 1; $R_1 = R_3 = R_5 = R_7$ = linear alkyl radical containing from 1 to 3 carbon atoms; $R_2 = R_4 = R_6 = R_8$ = phenyl radical; x+y ranges from 0 to 100 and, preferably, from 4 to 70.

As specific examples of suitable siloxane diisocyanates, particularly representative are:

6.

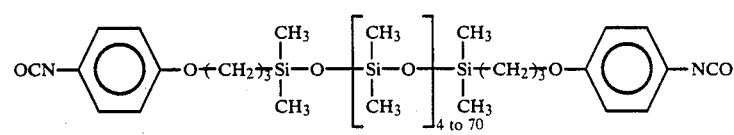

9.

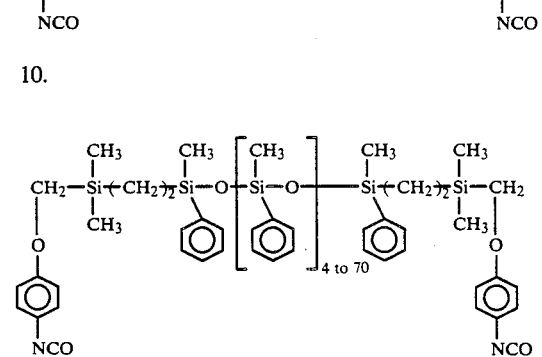

10.

11.

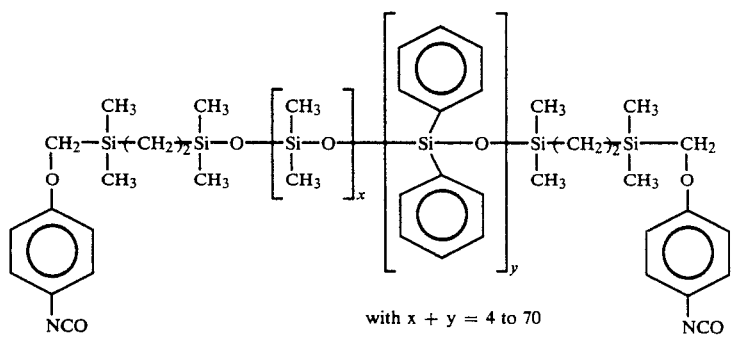

with x + y = 4 to 70

The siloxane diisocyanates (iii) of formula (III) which are preferably employed include those where the diorganopolysiloxane group contains both Si-alkyl (or Si-substituted alkyl) moieties and Si-phenyl (or Si-substituted phenyl) moieties. Compounds of this type which are particularly suitable are those belonging to the following groups, classified in an increasing order of preference:

(a) abovementioned compounds Nos. 2, 3, 4 and 5;
(b) abovementioned compounds Nos. 7, 8, 10 and 11.

The siloxane diisocyanates (iii) of formula (III) are compounds which are well known to this art. They are described, for example, in U.S. Pat. No. 4,518,758.

The reaction for preparing the polyimidoamides according to the present invention is conducted in a homogeneous medium by the addition to the reactants (i), (ii) and (iii) of a solvent or a mixture of solvents which are common to the reactants and to the product formed. The solvents which are suitable are polar solvents, in particular N,N-dimethylacetamide, N,N-dimethylformamide, N-methyl-2-pyrrolidone, dimethyl sulfoxide, 1,1,3,3-tetramethylurea, 1,3-dimethylurea, 1,3-dimethyl-2-imidazolidone, 1,3-dimethyl-3,4,5,6-tetrahydro-2-pyrimidone and a mixture of these solvents; they must, however, be perfectly anhydrous.

The proportions of the reactants (i) and (ii) are preferably selected such that the ratio r: number of moles of anhydride (ii)/number of moles of diisocyanate (i), ranges from 1.05/1 to 2.

In actual practice, the starting reactants, which are used together, are dissolved in the solvent(s), the operation preferably being carried out at ambient temperature (on the order to 20° C. to 30° C.), and the temperature of the resulting solution is then increased to the desired reaction temperature of from 50° C. to 210° C., either directly or progressively. The operation is generally carried out at atmospheric pressure over a period of time which will vary to a large extent as a function of the precise temperature conditions employed. In a highly preferred embodiment, the operating process comprises increasing the reaction solution to a temperature of from 50° C. to 110° C. when the reaction begins and then increasing the temperature during the reaction, from 50° C. to 110° C. at the beginning of the reaction, up to 180° C. to 210° C. following a program with a first temperature increase on the order of +60° C. to +90° C. at the end of a first time period varying from 30 minutes to 2 hours, followed by a second temperature increase on the order of +10° C. to +100° C. at the end of a second time period varying from 3 hours to 5 hours. Once the desired maximum temperature (between 180° C. and 210° C.) has been reached, a plateau of heating at this temperature continues to be maintained for a period of time ranging from 20 minutes to 2 hours.

The reaction for preparing the copolyimidoamides according to the present invention may, if need be, be conducted in the presence of a suitable catalyst. The catalysts which can be employed, where applicable, are organic compounds comprising no functional groups containing a mobile hydrogen capable of reacting with isocyanate groups. Particularly suitable from this point of view are the tertiary amines belonging to the class of mono- or polycyclic compounds containing at least one intra- and/or extracyclic tertiary nitrogen atom. Specific examples of such catalysts are, in particular, 1,4-diazobicyclo[2.2.2]octane, N,N'-dialkylpiperazines, N-alkylmorpholine, and N-alkylpiperidine, in which compounds the alkyl radical is a methyl and/or ethyl radical. The use of metal salts as catalysts is also intended. Specific examples of such catalysts are, in particular, dibutyltin dilaurate and cobalt acetylacetonate.

When it is elected to use a catalyst, its quantity generally represents from 0.1 to 2% of the total weight of the dissolved reactants (i), (ii) and (iii).

Upon completion of the reaction, the copolymer is obtained in solution form. It can be precipitated by adding a nonsolvent or a mixture of nonsolvents to the reaction mixture and separating the precipitated polymer from the reaction medium. Suitable nonsolvents are, for example, water, acetone, tetrahydrofuran, toluene or any other solvent which does not dissolve the desired polymer. The polymer can also be obtained by evaporating off the solvent(s) from the reaction mixture in a ventilated oven.

The copolyimidoamides thus produced, in solution form, are especially suitable for the manufacture of fibers and insulating varnishes, this being either during the solvent evaporation or subsequently. In precipitate form, these polymers can be used especially for the manufacture of shaped articles, using injection molding or compression molding techniques.

In order to further illustrate the present invention and the advantages thereof, the following specific examples are given, it being understood that same are intended only as illustrative and in nowise limitative.

EXAMPLE 1:

1. Preparation of a copolymer according to the present invention:

The following materials were introduced at ambient temperature (23° C.) into a glass reactor fitted with an anchor-type central stirrer and a vertical condenser, in which a slight overpressure of dry nitrogen was established:

(1) 21.6 g (0.1125 moles) of monoanhydride of trimellitic acid;
(2) 26.4 g (0.1048 moles) of 4,4'-diisocyanatodiphenyl ether;
(3) 11.7 g (0.0077 moles) of the diisocyanate containing the diorganopolysiloxane group described in paragraph 2 below; and
(4) 140 g of N-methyl-2-pyrrolidone.

The reaction mixture was stirred at ambient temperature (23° C.) for 15 minutes and was then heated to 100° C. Stirring was continued while following the temperature increase sequence outlined below:

(a) 1 h, 30 min, at 100° C., followed by heating from 100° C. to 185° C.;
(b) 4 h at 185° C., followed by heating from 185° C. to 198° C; and
(c) 1 h at 198° C.

The copoly(imide/amide) resin or solution thus obtained was a brown-colored liquid mass weighing 190 g (containing 50 g of polymer). Infrared analysis showed the presence of imide C=O bands at $\nu = 1710-1770$ cm$^{-1}$ in the resin, and the absence of anhydride C=O at $\nu = 1850$ cm$^{-1}$ and isocyanate at $\nu = 2270$ cm$^{-1}$.

The copoly(imide/amide) was precipitated by adding water to the resin by introducing 100 g of resin into 1,000 cm$^3$ of water with vigorous stirring. The precipitate obtained was filtered off, was washed with 250 cm$^3$ of water, and was then dried at 100° C. for 12 hours at a reduced pressure of $53.2 \times 10^2$ Pa. The product thus obtained was a pale yellow powder weighing 26 g.

The copoly(imide/amide) prepared in this example contained, in its structure, recurring units represented by the following general formula:

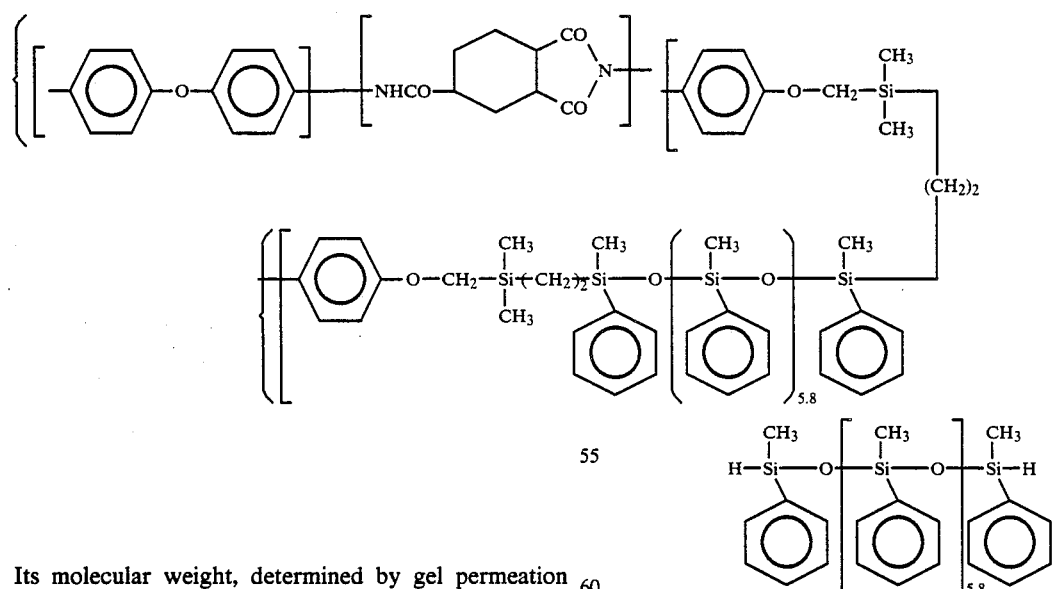

Its molecular weight, determined by gel permeation chromatography (solvent: N-methyl-2-pyrrolidone; temperature: 80° C.) was $M_w = 44,000$.

The weight yield of desired copoly(imide/amide) was 99.8%

2. Description of the process for preparing the siloxane diisocyanate starting material:

This diisocyanate had the following formula:

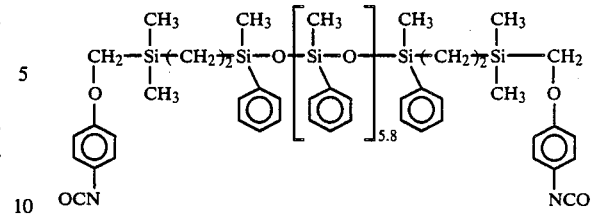

The following materials were charged into a glass reactor fitted with a central stirrer, a dropping funnel and a vertical condenser, in which a slight overpressure of dry nitrogen was established:

(1) 40 cm$^3$ of toluene;
(2) 38.7 g (0.166 moles) of an isocyanate compound of the formula:

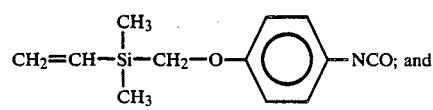

(3) a catalyst; this was a Karsted catalyst (a complex based on elemental platinum and 1,3-divinyl-1,1,3-3-tetramethyldisiloxane ligands): it was in solution in toluene (concentration of 0.06% by weight) and 2.2 cm$^3$ of this catalyst solution were introduced.

This mixture was stirred and heated to 70° C. with an oil bath. 75 g (0.072 moles) of an alpha,omega-bis(hydro)polysiloxane of formula:

which had an average molecular weight on the order of 1,047, in solution in 40 cm$^3$ of toluene were then gradually introduced into the reactor over 35 minutes.

The mixture thus obtained was then stirred and heated to 90° C. for 4 hours. Then, at the end of this period, the reaction mass was devolatilized for 45 minutes at 120° C. at a reduced pressure of $0.67 \times 10^2$ Pa. A compound having the formula given above was thus obtained, whose average molecular weight Was 1513.

EXAMPLE 2:

The following materials were introduced in succession at ambient temperature (23° C.) into the reactor employed in Example 1:

(1) 15.1 g (0.0786 moles) of the monoanhydride of trimellitic acid;

(2) 17.5 q (0.0694 moles) of 4,4'-diisocyanatodiphenyl ether:

(3) 14 g (0.0092 moles) of a diisocyanate containing the diorganopolysiloxane group described above in Example 1; and (4) 112 g of N-methyl-2-pyrrolidone.

The reaction mixture was stirred at ambient temperature for 15 minutes and was then heated to 100° C. Stirring was continued while following the temperature increase sequence outlined below:

(a) 1 h, 30 min, at 100° C., followed by heating from 100° C. to 185° C.;

(b) 4 h at 185° C., followed by heating from 185° C. to 198° C.; and (c) 30 min at 198° C.

The copoly(imide/amide) resin or solution thus obtained was a brown-colored liquid mass weighing 134 g (containing 22 g of polymer). As in Example 1, infrared spectrometry showed the presence of imide C=0 bands at $\nu = 1710-1770$ cm$^{-1}$ in the resin and the absence of an anhydride C=0 band at $\nu = 1850$ cm$^{-1}$ and isocyanate at $\nu = 2270$ cm$^{-1}$. A copolymer having the structure given in Example 1 was thus obtained, whose molecular weight, determined by gel permeation chromatography, was $M_w = 35,000$.

The weight yield of copoly(imide/amide) was 99.6%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of copolyimidoamide comprising recurring diorganopolysiloxane structural units, which comprises directly reacting the following reactants (i), (ii) and (iii), at a temperature ranging from 50° C. to 210° C. and in the presence of at least one organic solvent:

(i) a diisocyanate of thee formula:

$$OCN-\bigcirc-A-\bigcirc-NCO \quad (I)$$

in which A is a single valence bond or one of the groups:

$$-CH_2-, -\underset{\underset{CH_3}{|}}{\overset{\overset{CH_3}{|}}{C}}-, -O-, -S-, -\underset{\underset{O}{||}}{\overset{\overset{O}{||}}{S}}-, H-\underset{|}{\overset{|}{C}}-\bigcirc,$$

(ii) a monoanhydride of a tricarboxylic acid of the formula:

$$HOOC-B\overset{CO}{\underset{CO}{\diagup\diagdown}}O \quad (II)$$

in which B is a trivalent aromatic radical or a substituted such radical, or two such radicals bonded together by a single valance bond or via one of the groups:

$$-CH_2-, -\underset{\underset{CH_3}{|}}{\overset{\overset{CH_3}{|}}{C}}-, -O- \text{ or } -\underset{\underset{O}{||}}{\overset{}{C}}-; \text{ and}$$

(iii) a diisocyanate comprising recurring diorganopolysiloxane structural units and having the formula:

$$OCN-D-\underset{R_2}{\overset{R_1}{Si}}-O\left[\underset{R_4}{\overset{R_3}{Si}}-O\right]_x\left[\underset{R_6}{\overset{R_5}{Si}}-O\right]_y\underset{R_8}{\overset{R_7}{Si}}-D-NCO \quad (III)$$

in which D is a divalent radical of the formula:

$$-\bigcirc-E-CHR_9-CR_{10}R_{11}- \quad (IV)$$

the benzene ring of which is bonded to the isocyanate functional group NCO; E is a single valence bond, a diorganosilyl radical of the formula:

$$-\underset{\underset{CH_3}{|}}{\overset{\overset{CH_3}{|}}{Si}}-, \quad -\underset{\underset{CH_3}{|}}{\overset{\overset{}{|}}{Si}}- \text{ or } -\underset{\underset{\bigcirc}{|}}{\overset{\overset{\bigcirc}{|}}{Si}}-,$$

or a divalent alkylene radical containing from 1 to 6 carbon atoms bonded to the benzene ring by a single valence bond, or via an oxygen atom, a sulfur atom, an ester functional group or an amide functional group, and to the $CHR_9$-$CR_{10}R_{11}$ group by a single valence bond or via a diorganosilyl radical of the formula:

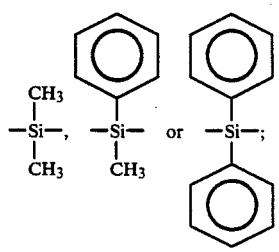

each of $R_9$, $R_{10}$ and $R_{11}$, which may be identical or different, is a hydrogen atom or a linear or branched chain alkyl radical containing from 1 to 6 carbon atoms; each of $R_1$, $R_2$, $R_3$, $R_4$, $R_5$, $R_6$, $R_7$ and $R_8$, which may be identical or different, is a linear or branched chain alkyl radical containing from 1 to 12 carbon atoms, or a substituted such radical bearing one or more chlorine, bromine or fluorine atom substituents or —CN groups, or a phenyl radical or phenyl radical substituted by one or more alkyl and/or alkoxy radicals containing from 1 to 4 carbon atoms or by one or more chlorine atoms; and x and Y are numbers, which may be identical or different, whole or fractional, the sum of which ranges from 0 to 100.

2. The process as defined by claim 1, wherein the respective proportions of the reactants (i) and (ii) are such that the ratio r:

number of moles of anhydride (ii)/number of moles of diisocyanate (i) ranges from 1.01/1 to 3/1; and the proportion of the reactant (iii) is such that the ratio r':

number of moles of siloxane diisocyanate (iii)/(number of moles of anhydride (ii)— number of moles of diisocyanate (i))

is equal to 1.

3. The process as defined by claim 2, said diisocyanate (i) comprising 4,4'-diisocyanato-2,2-diphenylpropane, 4,4'-diisocyanatodiphenylmethane, 4,4'-diisocyanatobiphenyl, 4,4'-diisocyanatodiphenyl sulfide, 4,4'-diisocyanatodiphenyl sulfone, 4,4'-diisocyanatodiphenyl ether, or 4,4'-diisocyanato-1,1-diphenylcyclohexane.

4. The process as defined by claim 2, said monoanhydride of a tricarboxylic acid (ii) comprising the monoanhydride of trimellitic acid, the 2,3-monoanhydride of 2,3,6-naphthalenetricarboxylic acid, the 1,8-monoanhydride of 1,8,4-naphthalenetricarboxylic acid, the 1,2-monoanhydride of 1,2,5-naphthalenetricarboxylic acid, the 3,4-monoanhydride of 3,4,4'-diphenyltricarboxylic acid, the 3,4-monoanhydride of diphenyl sulfone 3,4,3'-tricarboxylic acid, the 3,4-monoanhydride of diphenyl ether 3,4,4'-tricarboxylic acid, the 3,4-monoanhydride of 3,4,4'-benzophenonetricarboxylic acid, or the 3,4-monoanhydride of 3,4,3'-diphenylisopropylidenetricarboxylic acid.

5. The process as defined by claim 2, the diorganopolysiloxane recurring units of said siloxane diisocyanate (iii) comprising both Si-alkyl or Si-substituted alkyl radicals and Si-phenyl or Si-substituted phenyl radicals.

6. The process as defined by claim 5, wherein said siloxane diisocyanate (iii), the divalent radical D has one of the formulae:

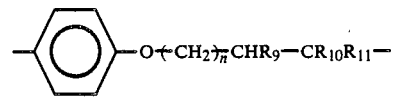

or

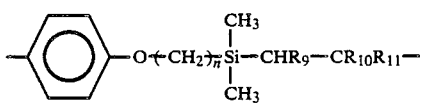

in which n=1, 2 or 3 and $R_9=R_{10}=R_{11}=$ a hydrogen atom or a linear alkyl radical containing from 1 to 3 carbon atoms; and $R_1=R_2=R_3=R_4=R_7=R_8=$ a linear alkyl radical containing from 1 to 3 carbon atoms; $R_5=R_6=$ a phenyl radial; and x+y ranges from 0 to 100.

7. The process as defined by claim 6, wherein said divalent radical D, x+y ranges from 4 to 70.

8. The process as defined by claim 5, wherein said siloxane diisocyanate (iii), the divalent radical D has one of the formulae:

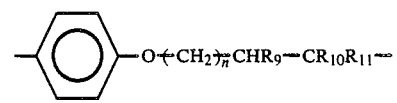

or

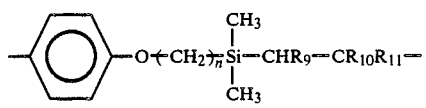

in which n=1, 2 or 3 and $R_9=R_{10}=R_{11}=$ a hydrogen atom or a linear alkyl radical containing from 1 to 3 carbon atoms; and $R_1=R_2=R_7=R_8=$ a linear alkyl radical containing from 1 to 3 carbon atoms; $R_3=R_4=R_5=R_6=$ a phenyl radical; and x+y ranges from 0 to 100.

9. The process as defined by claim 8, wherein said divalent radical D, x+y ranges from 4 to 70.

10. The process as defined by claim 5, wherein said siloxane diisocyanate (iii), the divalent radical D has one of the formulae:

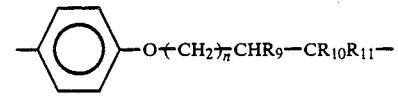

or

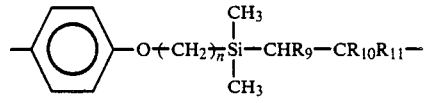

in which n=1, 2 or 3 and $R_9=R_{10}=R_{11}=$ a hydrogen atom or a linear alkyl radical containing from 1 to 3 carbon atoms; and $R_1=R_2=R_3=R_5=R_7=R_8=$ a linear alkyl radical containing from 1 to 3 carbon atoms; $R_4=R_6=$ a phenyl radical; and x+y ranges from 0 to 100.

11. The process as defined by claim 10, wherein said divalent radical D, x+y ranges from 4 to 70.

12. The process as defined by claim 5, wherein said siloxane diisocyanate (iii), the divalent radical D has one of the formulae:

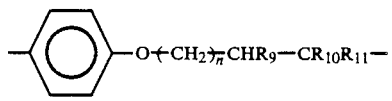

or

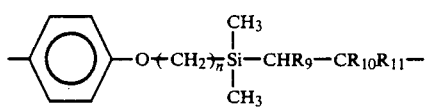

in which n=1, 2 or 3 and $R_9=R_{10}=R_{11}=$ a hydrogen atom or a linear alkyl radical containing from 1 to 3 carbon atoms; $R_1=R_3=R_5=R_7=$ a linear alkyl radical containing from 1 to 3 carbon atoms; $R_2=R_4=R_6=R_8=$ a phenyl radical; and x+y ranges from 0 to 100.

13. The process as defined by claim 12, wherein said divalent radical D, x+y ranges from 4 to 70.

14. The process as defined by claim 2, comprising dissolving said starting reactants (i), (ii) and (iii) in said at least one organic solvent at ambient temperature, and then increasing the temperature of the resulting solution to a reaction temperature ranging from 50° C. to 210° C. at atmospheric pressure.

15. The process as defined by claim 2, said at least one solvent N,N-dimethylacetamide, N,N-dimethylformamide, N-methyl-2-pyrrolidone, dimethyl sulfoxide, 1,1,3,3-tetramethylurea, 1,3-dimethylurea, 1,3-dimethyl-2-imidazolidone, 1,3-dimethyl-3,4,5,6-tetrahydro-2-pyrimidone, or mixture thereof.

16. The product of the process as defined by claim 1.

17. The product of the process as defined by claim 2.

* * * * *